(12) United States Patent
Kim et al.

(10) Patent No.: US 9,499,152 B2
(45) Date of Patent: Nov. 22, 2016

(54) BRAKE DEVICE FOR VEHICLE

(71) Applicant: HYUNDAI MOBIS CO., LTD., Seoul (KR)

(72) Inventors: Jong Sung Kim, Yongin-si (KR); Soung Jun Park, Ansan-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/682,017

(22) Filed: Apr. 8, 2015

(65) Prior Publication Data
US 2016/0059836 A1    Mar. 3, 2016

(30) Foreign Application Priority Data
Sep. 2, 2014  (KR) .................. 10-2014-0115997

(51) Int. Cl.
| | |
|---|---|
| *B60T 8/34* | (2006.01) |
| *B60T 13/74* | (2006.01) |
| *B60T 7/04* | (2006.01) |
| *B60T 13/16* | (2006.01) |
| *B60T 13/66* | (2006.01) |

(Continued)

(52) U.S. Cl.
CPC .............. *B60T 13/741* (2013.01); *B60T 7/042* (2013.01); *B60T 8/4081* (2013.01); *B60T 13/166* (2013.01); *B60T 13/662* (2013.01); *B60T 13/686* (2013.01)

(58) Field of Classification Search
CPC ...... B60T 13/16; B60T 13/68; B60T 13/161; B60T 13/741; B60T 8/17; B60T 8/4086; B60T 17/221; B60T 7/042; B60T 7/17; B60L 7/26; B60K 6/485; B60K 6/365

USPC .............. 303/10, 113.1, 113.4, 116.2, 115.1, 303/115.2, 122, 122.04, 122.09
See application file for complete search history.

(56) References Cited

U.S. PATENT DOCUMENTS

| | | | | |
|---|---|---|---|---|
| 3,176,467 | A | * | 4/1965 | Van House ........... B60T 13/142 188/170 |
| 3,971,595 | A | * | 7/1976 | Kondo .................. B60T 13/144 303/10 |

(Continued)

FOREIGN PATENT DOCUMENTS

| | | |
|---|---|---|
| JP | 2006-069302 A | 3/2006 |
| JP | 2012-106626 A | 6/2012 |

(Continued)

OTHER PUBLICATIONS

Office Action dated Jul. 14, 2015 of corresponding Korean Patent Application No. 10-2014-0115997—4 pages.

*Primary Examiner* — Christopher Schwartz
(74) *Attorney, Agent, or Firm* — Knobbe Martens Olson & Bear LLP (57) ABSTRACT

A brake device for a vehicle may include: a master cylinder generating hydraulic pressure using pressure applied to a pedal; a pedal simulator connected to the master cylinder and providing a pedal force to the pedal; a pair of diverging line parts connected to the master cylinder and receiving hydraulic pressure; a front wheel line part connected to the diverging line part and transferring hydraulic pressure to a front wheel part; a rear wheel line part connected to the front wheel line part and transferring hydraulic pressure to a rear wheel part; and an electric booster installed between the front wheel line part and the front wheel part, and providing hydraulic pressure.

11 Claims, 4 Drawing Sheets

(51) Int. Cl.
  *B60T 13/68* (2006.01)
  *B60T 8/40* (2006.01)

(56) References Cited

U.S. PATENT DOCUMENTS

| | | | | |
|---|---|---|---|---|
| 5,106,167 | A * | 4/1992 | Matsuda | B60T 7/042 303/117.1 |
| 6,089,678 | A * | 7/2000 | Mortimer | B60T 7/042 303/10 |
| 7,823,985 | B2 * | 11/2010 | Hatano | B60Q 1/44 303/114.1 |
| 7,926,888 | B2 * | 4/2011 | Reuter | B60K 6/485 303/116.2 |
| 8,548,708 | B2 * | 10/2013 | Strengert | B60T 17/221 180/65.1 |
| 2002/0084693 | A1 * | 7/2002 | Isono | B60T 8/4018 303/113.1 |
| 2006/0214504 | A1 * | 9/2006 | Kusano | B60K 6/365 303/113.4 |
| 2007/0013230 | A1 * | 1/2007 | Yang | B60L 7/26 303/152 |
| 2007/0114837 | A1 * | 5/2007 | Kusano | B60T 7/042 303/10 |
| 2009/0033144 | A1 * | 2/2009 | Ikeda | B60T 8/3225 303/20 |
| 2013/0127236 | A1 * | 5/2013 | Hakiai | B60T 17/221 303/3 |
| 2013/0147259 | A1 * | 6/2013 | Linkenbach | B60T 7/042 303/14 |
| 2014/0159476 | A1 * | 6/2014 | Griffin | B60T 7/12 303/186 |
| 2014/0197680 | A1 * | 7/2014 | Gilles | B60T 8/3275 303/2 |

FOREIGN PATENT DOCUMENTS

| | | |
|---|---|---|
| KR | 10-2011-0065845 A | 6/2011 |
| KR | 10-2012-0053216 A | 5/2012 |
| KR | 10-2014-0000505 A | 1/2014 |
| KR | 10-2014-0066404 A | 6/2014 |

* cited by examiner

BRAKE DEVICE FOR VEHICLE

CROSS-REFERENCES TO RELATED APPLICATIONS

The present application claims priority to Korean application number 10-2014-0115997, filed on Sep. 2, 2014, which is incorporated by reference in its entirety.

BACKGROUND

The present disclosure relates to a brake device for a vehicle, and more particularly, to a brake device for a vehicle, which is capable of improving a braking force while reducing a production cost.

In general, a brake device refers to a device for decelerating or stopping a vehicle. Recently, an EMB (Electromechanical Brake) has been developed to replace existing hydraulic brake systems. The EMB has a smaller number of parts than the hydraulic brake system, can be reduced in weight, has excellent modularity, and exhibits more excellent braking performance than the existing hydraulic brake systems.

According to the recent trend, the brake devices for a vehicle have been required to have a function of performing active control regardless of a pedal force of a driver, and a vacuum booster has been removed to implement a vacuum free brake system. Among various brake devices, a brake device using an electric booster can secure cost competitiveness while maintaining braking performance.

The related art is disclosed in Korean Patent Laid-open Publication No. 2011-0065845 published on Jun. 16, 2011 and titled "Brake system for vehicle".

SUMMARY

Embodiments of the present invention are directed to a brake device for a vehicle, which is capable of improving a braking force while reducing a production cost.

In one embodiment, a brake device for a vehicle may include: a master cylinder generating hydraulic pressure using pressure applied to a pedal; a pedal simulator connected to the master cylinder and providing a pedal force to the pedal; a pair of diverging line parts connected to the master cylinder and receiving hydraulic pressure; a front wheel line part connected to the diverging line part and transferring hydraulic pressure to a front wheel part; a rear wheel line part connected to the front wheel line part and transferring hydraulic pressure to a rear wheel part; and an electric booster installed between the front wheel line part and the front wheel part, and providing hydraulic pressure.

The brake device may further include: an accumulator part connected to the front wheel line part and the rear wheel line part and storing hydraulic pressure; and a motor pump connected to the rear wheel line part and supplying hydraulic pressure.

The diverging line part may include: a diverging supply part connected to the master cylinder; a diverging connection part connecting the diverging supply part and the front wheel line part; and a normal open valve installed on the diverging connection part, and opening the diverging connection part in a state where an electrical signal is not received.

The diverging line part may further include: a diverging storage part connecting the diverging supply part and the accumulator part; and a normal closed valve mounted on the diverging storage part, and closing the diverging storage part in a state where an electrical signal is not received.

When the electric signal is received, the normal open valve may close the diverging connection part, and the normal closed valve may open the diverging storage part.

The front wheel line part may include: a front wheel guide part connecting the diverging supply part and the electrical booster; and a front wheel valve mounted on the front wheel guide part and opening/closing the front wheel guide part.

The rear wheel line part may include: a rear wheel guide part connecting the front wheel guide part and the rear wheel part; a rear wheel valve mounted on the rear wheel guide part and opening/closing the rear wheel guide part; a rear wheel bypass part having both ends connected to the rear wheel guide part, and inducing hydraulic pressure to bypass the rear wheel valve; and a check valve mounted on the rear wheel bypass part, and allowing hydraulic pressure to flow only in one direction.

The accumulator part may include: an accumulator; a pump connection part connecting the motor pump and the accumulator; a diverging connection part connecting the diverging storage part and the accumulator; a front wheel connection part connecting the front wheel guide part and the accumulator; and a rear wheel connection part connecting the rear wheel guide part and the accumulator.

The diverging connection part may include a connection check valve which allows hydraulic pressure to flow only in one direction, the front wheel connection part may include a front wheel opening/closing part, and the rear wheel connection part may include a rear wheel opening/closing part.

One end of the diverging connection part may be connected to the normal closed valve formed at an end of the diverging storage unit, and the other end of the diverging connection part may be connected to the pump connection part formed between the motor pump and the connection check valve.

One end of the front wheel connection part may be connected to the front wheel guide part formed between the front wheel valve and the electric booster, and the other end of the front wheel connection part may be connected to the pump connection part formed between the connection check valve and the accumulator.

One end of the rear wheel connection part may be connected to the rear wheel guide part formed between the rear wheel bypass part and the rear wheel part, and the other end of the rear wheel connection part may be connected to the front wheel connection part formed between the front wheel opening/closing part and the accumulator.

The electric booster may be operated through operation of a motor, and provide hydraulic pressure to the front wheel line part and the front wheel part.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Generally, a brake device or system for a vehicle using an electric booster includes a master cylinder which generates hydraulic pressure using a driver's pedal force and another master cylinder which generates a brake pressure using the electric booster and is connected to a hydraulic circuit. At this time, a solenoid valve connected to the master cylinder for generating a brake force using a driver's pedal force is a normal open type, and a solenoid valve connected to the electric booster is a normal closed type. During a normal brake operation, a brake pressure of the electric booster is applied. During an emergency, a brake pressure generated through a pedal force is applied.

Since the above brake device uses a single electric booster, the capacity of the motor may be inevitably increased. Thus, the production cost may increase, and the braking force may decrease.

Figure 1:
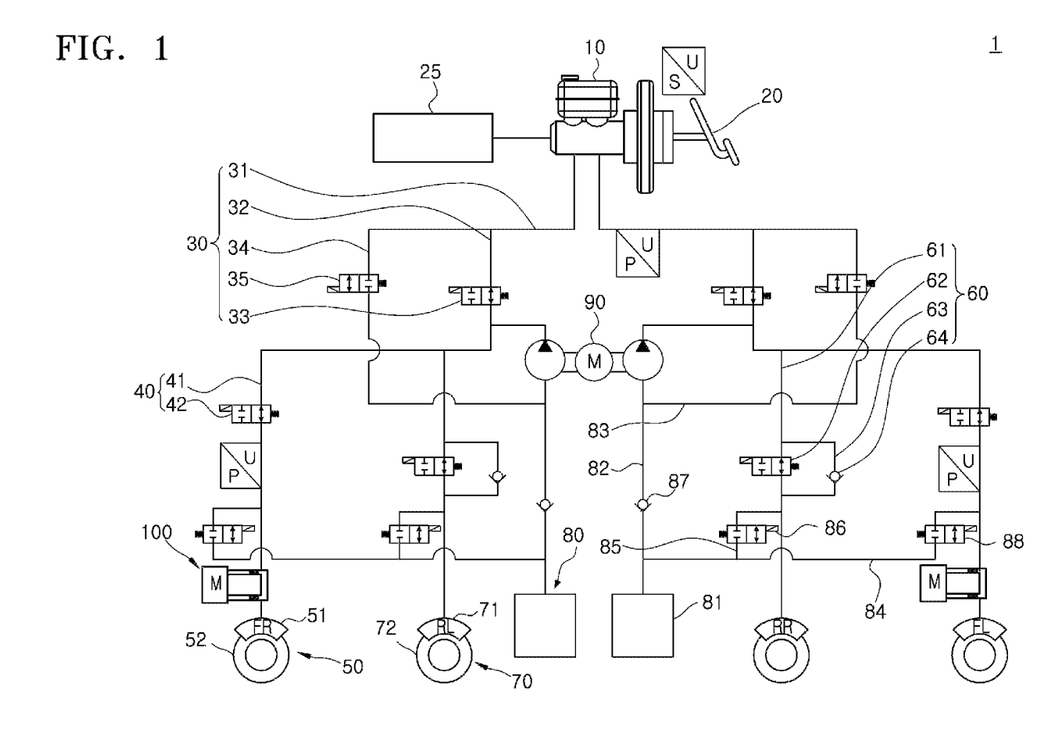
FIG. 1 is a diagram schematically illustrating a brake device for a vehicle in accordance with an embodiment of the present invention.
Figure 2:
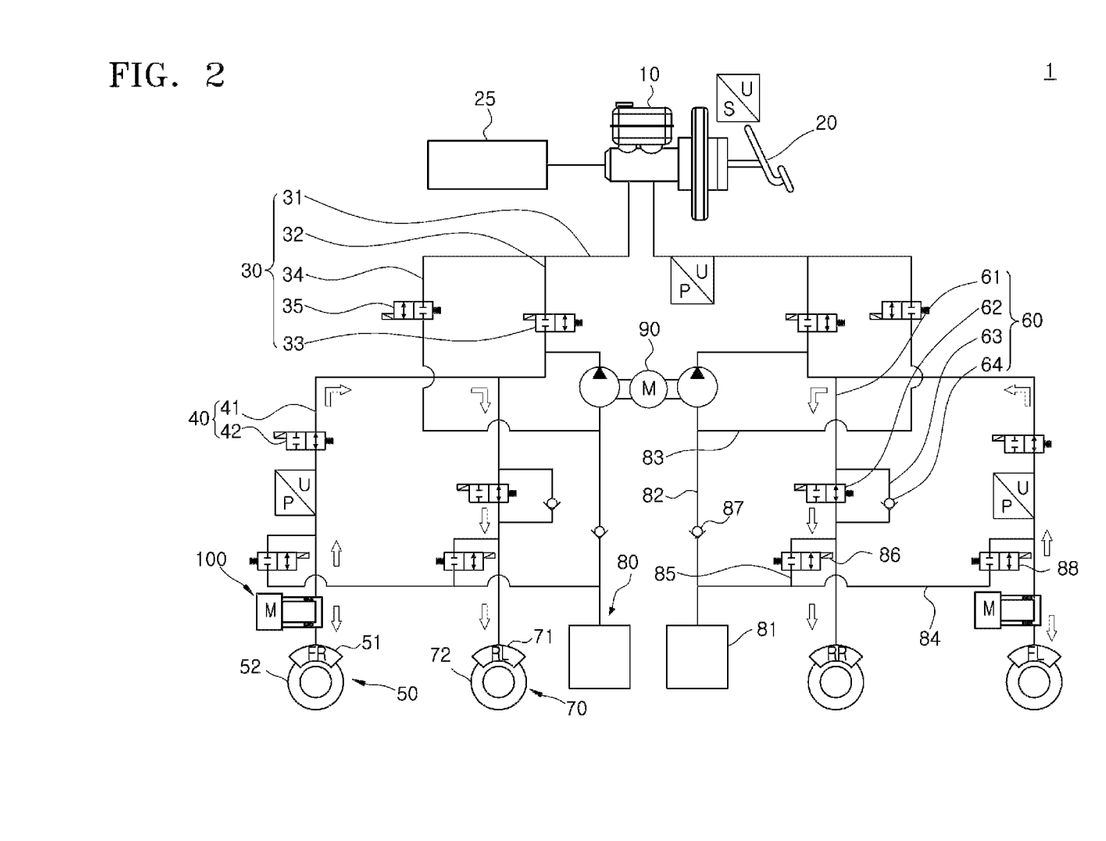
FIG. 2 is a diagram schematically illustrating a flow of hydraulic pressure during a normal braking operation in the brake device for a vehicle in accordance with the embodiment of the present invention.
Figure 3:
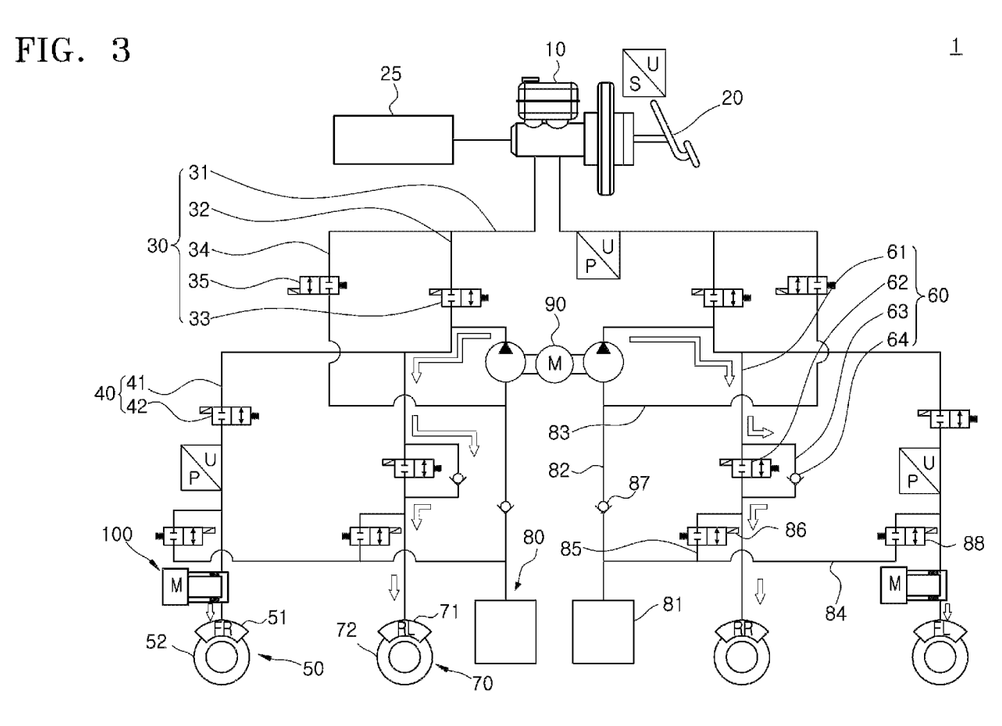
FIG. 3 is a diagram schematically illustrating a flow of hydraulic pressure during an ABS braking operation in the brake device for a vehicle in accordance with the embodiment of the present invention.
Figure 4:
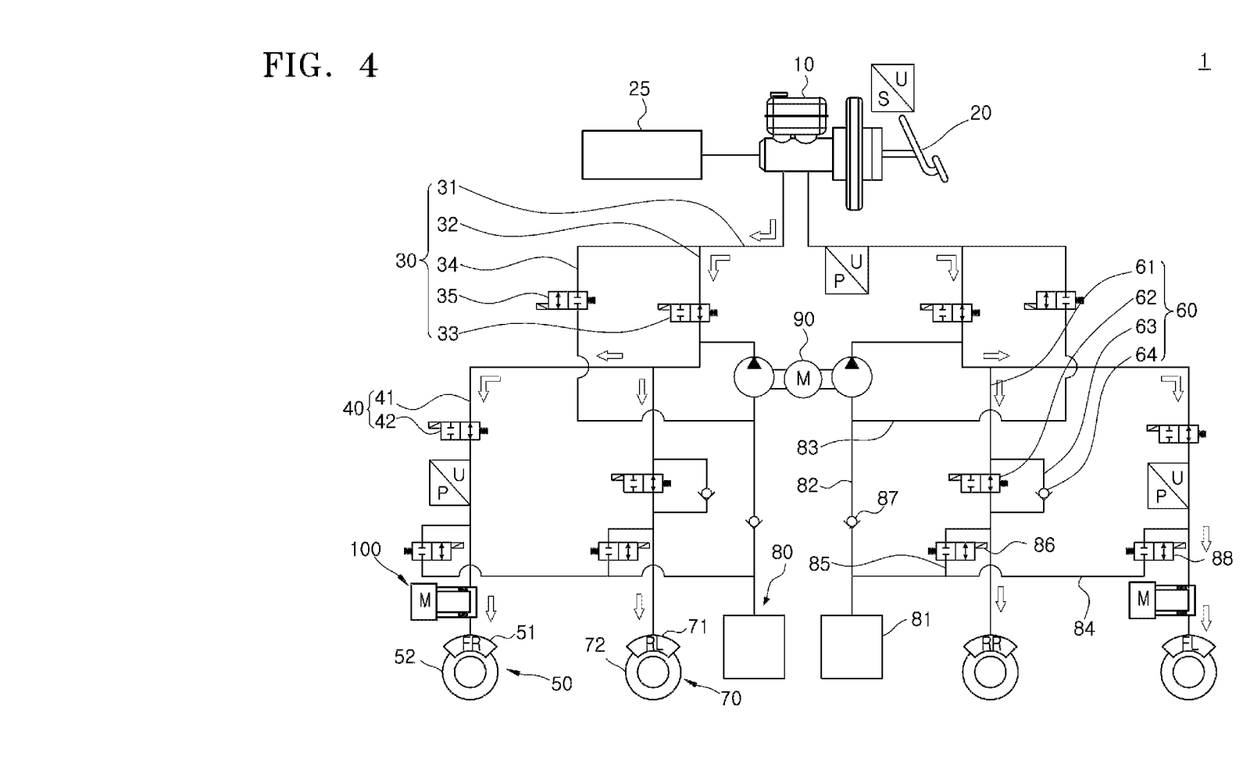
FIG. 4 is a diagram schematically illustrating a flow of hydraulic pressure supplied to a front wheel part and a rear wheel part when an electric booster in accordance with the embodiment of the present invention is abnormal.

FIG. 1 is a diagram schematically illustrating a brake device for a vehicle in accordance with an embodiment of the present invention. FIG. 2 is a diagram schematically illustrating a flow of hydraulic pressure during a normal braking operation in the brake device for a vehicle in accordance with the embodiment of the present invention. FIG. 3 is a diagram schematically illustrating a flow of hydraulic pressure during an ABS braking operation in the brake device for a vehicle in accordance with the embodiment of the present invention. FIG. 4 is a diagram schematically illustrating a flow of hydraulic pressure supplied to a front wheel part and a rear wheel part when an electric booster in accordance with the embodiment of the present invention is abnormal.

As illustrated in FIG. 1, the brake device 1 for a vehicle in accordance with the embodiment of the present invention may include a master cylinder 10, a pedal 20, a pedal simulator 25, a diverging line part 30, a front wheel line part 40, a front wheel part 50, a rear wheel line part 60, a rear wheel part 70, an accumulator part 80, a motor pump 90, and an electric booster 100.

The master cylinder 10 may generate hydraulic pressure using a pressure applied to the pedal, and the pedal simulator 25 may be connected to the master cylinder 10 so as to provide a pedal force to the pedal. That is, the master cylinder 10 may be mounted on the vehicle body, and the pedal 20 may pressurize the master cylinder 10. In an embodiment, the pedal 20 may be positioned at the bottom of a driver's seat such that a driver can step on the pedal 20. Furthermore, when the pedal 20 pressurizes the master cylinder 10, the hydraulic pressure of the master cylinder 10 may be amplified.

The pedal simulator 25 may be directly connected to the master cylinder 10 or connected to the diverging line part 30, and provide a pedal force to the pedal 20. Through the pedal simulator 25, the driver may have a pedal feel when stepping on the pedal 20.

The diverging line part 30 may be modified in various manners, as long as the diverging line part 30 is connected to the master cylinder 10 so as to receive hydraulic pressure. The diverging line part 30 may supply the hydraulic pressure generated from the master cylinder 10. For example, the master cylinder 10 may have two chambers formed therein, and the pair of diverging line parts 30 may be connected to the respective chambers so as to guide the hydraulic pressure.

The diverging line part 30 in accordance with the embodiment of the present invention may include the pair of diverging line parts which are connected to the master cylinder 10. Each of the diverging line parts 30 may include a diverging supply part 31, a diverging connection part 32, a normal open valve 33, a diverging storage part 34, and a normal closed valve 35.

The diverging supply part 31 may include a pair of diverging supply parts which are connected to the master cylinder 10 so as to guide hydraulic pressure. For example, the pedal simulator 25 may be connected to the diverging supply part 31.

The diverging connection part 32 may have one end connected to the diverging supply part 31 and the other end connected to the front wheel line part 40. The normal open valve 33 may be installed on the diverging connection part 32, and open the diverging connection part 32 in a state where an electrical signal is not received. The normal open valve 33 receiving the electrical signal may close the diverging connection part 32.

The diverging storage part 34 may have one end connected to the diverging supply part 31 and the other end connected to the accumulator part 80. The normal closed valve 35 may be mounted on the diverging storage part 34, and close the diverging storage part 34 in a state where an electrical signal is not received. The normal closed valve 35 receiving the electrical signal may open the diverging storage part 34.

The front wheel line part 40 may be connected to the diverging line part 30 so as to transfer hydraulic pressure to the front wheel part 50. The front wheel line part 40 may be connected to the diverging line part 30 so as to guide hydraulic pressure, and the electric booster 100 may be installed between the front wheel line part 40 and the front wheel part 50.

The front wheel line part 40 in accordance with the embodiment of the present invention may include a front wheel guide part 41 and a front wheel valve 42. The front wheel guide part 41 may connect the diverging connection part 32 and the electric booster 100. The front wheel valve 42 may be mounted on the front wheel guide part 41 so as to open/close the front wheel guide part 41. For example, one end of the front wheel guide part 41 may have be connected to the normal open valve 33 formed at the end of the diverging connection part 32, and the other end of the front wheel guide part 41 may be connected to the electric booster 100. The front wheel guide part 41 may have a hydraulic pressure sensor mounted thereon, the hydraulic pressure sensor measuring hydraulic pressure. During four-wheel independent active control, fluid pressure may leak when the hydraulic pressure between the front wheel valve 42 and the electric booster 100 increases to a higher value than the previous hydraulic pressure of the front wheel valve 42. In order to prevent the leakage, a check valve may be removed from the front wheel valve 42.

The front wheel part 50 may include left and right front wheel parts. The front wheel part 50 may include a front wheel 52 and a front wheel brake 51 which receives hydraulic pressure to restrict the rotation of the front wheel 52. On the front wheel line part 40 connected to each of the front wheel parts 50, the electric booster 100 may be installed to supply hydraulic pressure to the front wheel brake 51.

The rear wheel line part 60 may be modified in various manners, as long as the rear wheel line part 60 is connected to the front wheel line part 40 so as to transfer hydraulic pressure to the rear wheel part 70. The rear wheel line part 60 may be connected to the front wheel line part 40 so as to guide hydraulic pressure, and the rear wheel brake 71 of the rear wheel part 70 may be connected to the rear wheel line part 60. The rear wheel brake 71 may brake the rear wheel 72 using hydraulic pressure.

The rear wheel line part 60 in accordance with the embodiment of the present invention may include a rear wheel guide part 61, a rear wheel valve 62, a rear wheel bypass part 63, and a check valve 64. The rear wheel guide part 61 may connect the front wheel guide part 41 and the rear wheel part 70, and the rear wheel valve 62 may be mounted on the rear wheel guide part 61 so as to open/close the rear wheel guide part 61. For example, one end of the rear wheel guide part 61 may be connected to the front wheel guide part 41 between the normal open valve 33 and the front wheel valve 42. The rear wheel bypass part 63 may have both ends connected to the rear wheel guide part 61, and induce hydraulic pressure to bypass the rear wheel valve 62. The check valve 64 may be mounted on the rear wheel bypass part 63 so as to allow hydraulic pressure to flow only in one direction.

The rear wheel part 70 may include left and right rear wheel parts. The rear wheel part 70 may include a rear wheel 72 and a rear wheel brake 71 which receives hydraulic pressure to restrict the rotation of the rear wheel 72. The rear wheel line part 60 connected to each of the rear wheel parts 70 may receive hydraulic pressure through the electric booster 100 or the motor pump 90.

The accumulator part 80 may be modified in various manners, as long as the accumulator part 80 is connected to the front wheel line part 40 and the rear wheel line part 60 so as to store hydraulic pressure. The motor pump 90 may be modified in various manners, as long as the motor pump 90 is connected to the rear wheel line part 60 so as to supply hydraulic pressure.

The accumulator part 80 may store hydraulic pressure to perform a buffer function. The accumulator part 80 may be connected to the diverging line part 30, the front wheel line part 40, and the rear wheel line part 60, and adjust hydraulic pressure passing through the diverging line part 30, the front wheel line part 40, and the rear wheel line part 60. The motor pump 90 may be connected to the front wheel line part 40 so as to supply hydraulic pressure. For example, the motor pump 90 may be driven according to an electric signal, and provide hydraulic pressure to the rear wheel part 70.

The accumulator part 80 in accordance with the embodiment of the present invention may include an accumulator 81, a pump connection part 82, a diverging connection part 83, a front wheel connection part 84, and a rear wheel connection part 85. The pump connection part 82 may connect the motor pump 90 and the accumulator 81, the diverging connection part 83 may connect the diverging storage part 34 and the accumulator 81, the front wheel connection part 84 may connect the front wheel guide part 41 and the accumulator 81, and the rear wheel connection part 85 may connect the rear wheel guide part 61 and the accumulator 81. The diverging connection part 83 may include a connection check valve 87 which allows hydraulic pressure to flow only in one direction, and the front wheel connection part 84 may include a front wheel opening/closing part 88 which opens/closes the front wheel connection part 84. The rear wheel connection part 85 may include a rear wheel opening/closing part 86 which opens/closes the rear wheel connection part 85.

For example, the pump connection part 82 may have one end connected to the motor pump 90 and the other end connected to the accumulator 81. One end of the diverging connection part 83 may be connected to the normal closed valve 35 formed at the end of the diverging storage part 34, and the other end of the diverging connection part 83 may be connected to the pump connection part 82 formed between the motor pump 90 and the connection check valve 87. One end of the front wheel connection part 84 may be connected to the front wheel guide part 41 formed between the front wheel valve 42 and the electric booster 100, and the other end of the front wheel connection part 84 may be connected to the pump connection part 82 formed between the connection check valve 87 and the accumulator 81. One end of the rear wheel connection part 85 may be connected to the rear wheel guide part 61 formed between the rear wheel bypass part 63 and the rear wheel part 70, and the other end of the rear wheel connection part 85 may be connected to the front wheel connection part 84 formed between the front wheel opening/closing part 88 and the accumulator 81.

The motor pump 90 in accordance with the embodiment of the present invention may be connected to the front wheel line part 40 and the rear wheel line part 60. For example, the motor pump 90 may be connected to the front wheel guide part 41 formed between the normal open valve 33 and the front wheel valve 42.

The electric booster 100 may include various types of actuators, as long as the electric booster 100 is installed between the front wheel line part 40 and the front wheel part 50 so as to provide hydraulic pressure. The electric booster 100 in accordance with the embodiment of the present invention may be operated through operation of a motor, and provide hydraulic pressure to the front wheel line part 40 and the front wheel part 50. That is, the electric booster 100 may operate the motor according to a received electrical signal, and supply hydraulic pressure to the front wheel line part 40 and the front wheel part 50. Since the electric booster 100 is installed in each of the pair of front wheel parts 50, the electric booster 100 may reduce the capacity of the motor.

Hereafter, referring to the accompanying drawings, the operation state of the brake device 1 for a vehicle in accordance with the embodiment of the present invention will be described in detail.

Referring to FIG. 2, a flow of hydraulic flow in the brake device 1 for a vehicle during a normal braking operation will be described as follows. During the normal braking operation, the normal open valve 33 receiving an electrical signal may close the diverging connection part 32, and the normal closed valve 35 may close the diverging storage part 34. Thus, when a driver steps on the pedal 20, hydraulic pressure generated by the master cylinder 10 may be transferred to the pedal simulator 25 so as to acquire a pedal force for the rotation of the pedal 20.

The electric booster 100 operating in connection with the pressurization of the pedal 20 may supply hydraulic pressure in both directions. That is, the electric booster 100 may supply hydraulic pressure toward the front wheel part 50 and the front wheel line part 40. The hydraulic pressure supplied to the front wheel part 50 may operate the front wheel brake 51 to restrict the rotation of the front wheel 52. Furthermore, the hydraulic pressure transferred to the front wheel guide part 41 of the front wheel line part 40 may be transferred along the rear wheel guide part 61 of the rear wheel line part 60, and supplied to the rear wheel part 70. The hydraulic pressure supplied to the rear wheel part 70 may operate the rear wheel brake 71 to restrict the rotation of the rear wheel 72.

Referring to FIG. 3, a flow of hydraulic pressure in the brake device 1 for a vehicle during an ABS braking operation will be described as follows. During the ABS braking operation, the normal open valve 33 receiving an electrical signal may close the diverging connection part 32, and the normal closed valve 35 may close the diverging storage part 34. Furthermore, the front wheel valve 42 receiving an electrical signal may close the front wheel guide part 41.

Thus, the hydraulic pressure generated through the electric booster 100 may be transferred only to the front wheel part 50 so as to restrict the rotation of the front wheel 52. When a driver stops the vehicle in a hurry or stops the vehicle on a low-friction road, a wheel lock may occur. In this case, the electric booster 100 may actively control the front wheel part 50. Furthermore, as the motor pump 90 is driven, hydraulic pressure may be supplied to the rear wheel part 70 through the rear wheel bypass part 63. Then, the rear wheel 72 may be actively controlled.

Referring to FIG. 4, a flow of hydraulic pressure supplied to the front wheel part 50 and the rear wheel part 70 when the electric booster 100 in accordance with the embodiment of the present invention is abnormal will be described as follows. When the electric booster 100 is abnormally operated, the hydraulic pressure supplied from the master cylinder 10 may be provided to the front wheel part 50 and the rear wheel part 70 so as to brake the front wheel 52 and the rear wheel 72.

For example, when an error of the electric booster 100 occurs or an electrical error occurs across the entire brake system, control for each valve may be not performed. Thus, the normal open valve 33 may open the diverging connection part 32, and the normal closed valve 35 may close the diverging storage part 34. The front wheel valve 42 may open the front wheel guide part 41, and the rear wheel valve 62 may open the rear wheel guide part 61. Thus, as the hydraulic pressure generated from the master cylinder 10 is supplied to the front wheel part 50 and the rear wheel part 70, emergency braking may be performed on the front wheel 52 and the rear wheel 72.

In the present embodiment, it has been described that the electric booster 100 is installed only in the front wheel part 50. However, the electric booster 100 may be installed only in the front wheel part 50 or in both of the front wheel part 50 and the rear wheel part 70.

According to the embodiment of the present invention, since the electric booster 100 is installed in the two left and right front wheel parts 50, the capacity of the motor can be reduced, which makes it possible to reduce the production cost. Furthermore, since the electric booster 100 is installed in each of the front wheel parts 50 so as to rapidly provide hydraulic pressure to the front wheel part 50, the braking force can be improved. Furthermore, the modification of existing hydraulic circuits can be suppressed, and the use rate of common products can be increased to reduce the production cost. Furthermore, as a check valve is removed from the front wheel line part 40 and the diverging line part 30, the cost can be reduced.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A brake system for a vehicle, comprising:
a brake pedal;
a master cylinder configured to generate hydraulic pressure in response to pressing of the brake pedal;
a plurality of wheel brakes comprising a first wheel brake, a second wheel brake, a third wheel brake and a fourth wheel brake;
a first electric booster configured to generate hydraulic pressure in response to pressing of the brake pedal;
a second electric booster configured to generate hydraulic pressure in response to pressing of the brake pedal;
the first wheel brake in fluid communication with the first electric booster and further in fluid communication with the master cylinder via a first valve;
the second wheel brake in fluid communication with the second electric booster and further in fluid communication with the master cylinder via a second valve;
wherein if the first and second electric boosters are in normal operation, the system is configured to disconnect the fluid communication between the master cylinder and the first wheel brake and also to disconnect the fluid communication between the master cylinder and the second wheel brake such that the first wheel brake operated by hydraulic pressure from the first electric booster is fluidly disconnected from the second wheel brake operated by hydraulic pressure from the second electric booster,
wherein if both the first and second electric boosters are not in normal operation, the system is configured to connect the fluid communication between the master cylinder and the first wheel brake and also to connect the fluid communication between the master cylinder and the second wheel brake such that the first wheel brake and the second wheel brake are commonly operated by hydraulic pressure from the master cylinder.

2. The brake system of claim 1 further comprising an ABS motorized pump configured to generate hydraulic pressure for ABS braking,
wherein the ABS motorized pump is in fluid communication with the third wheel brake,
wherein when the ABS braking is needed, the system is configured to cause to supply the hydraulic pressure from the ABS motorized pump to the third wheel brake.

3. The brake system of claim 2,
wherein the third wheel brake is further in fluid communication with the first electric booster via a third valve,
wherein when the ABS braking is needed, the system is configured to close the third valve to fluidly disconnect the third wheel brake from the first electric booster and to cause to supply the hydraulic pressure from the ABS motorized pump to the third wheel brake.

4. The brake system of claim 3, wherein when the ABS braking is not needed, the system is configured to open the third valve to fluidly connect the third wheel brake from the first electric booster such that first wheel brake and the third wheel brake are commonly operated by hydraulic pressure from the first electric booster.

5. The brake system of claim 2,
wherein the ABS motorized pump is in fluid communication with the fourth wheel brake,
wherein when the ABS braking is needed, the system is configured to cause to supply the hydraulic pressure from the ABS motorized pump to the fourth wheel brake such that the third wheel brake and the fourth wheel brake are commonly operated by hydraulic pressure from the ABS motorized pump.

6. The brake system of claim 1, wherein the first valve is a normal open valve configured to connect the fluid communication between the first wheel brake and the master cylinder when a control signal is not received.

7. The brake system of claim 1, further comprising:
an accumulator connected to the master cylinder and configured to store fluid from the master cylinder.

8. The brake system of claim 7, further comprising a connection check valve between the master cylinder and the accumulator and configured to allow hydraulic pressure to flow only in one direction.

9. The brake system of claim 8, further comprising a hydraulic line connecting the first valve and the connection check valve.

10. The brake system of claim 1, wherein the second valve is a normal open valve configured to connect the fluid communication between the second wheel brake and the master cylinder when a control signal is not received.

11. The brake system of claim 1, further comprising:
a hydraulic line connecting the first wheel brake and the third wheel brake
a fourth valve installed on the hydraulic line connecting the first wheel brake and the third wheel brake;
a bypass hydraulic line connecting the first wheel brake and the third wheel brake and bypassing the forth valve; and
a check valve mounted on the hydraulic line connecting the first wheel brake and the third wheel brake configured to allow hydraulic pressure to flow only in one direction.

* * * * *